(12) United States Patent
St. Jacques

(10) Patent No.: US 7,970,835 B2
(45) Date of Patent: Jun. 28, 2011

(54) PEER-TO-PEER FILE SHARING SYSTEM AND METHOD USING DOWNLOADABLE DATA SEGMENTS

(75) Inventor: Robert St. Jacques, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 597 days.

(21) Appl. No.: 11/397,163

(22) Filed: Apr. 4, 2006

(65) Prior Publication Data
US 2007/0244894 A1 Oct. 18, 2007

(51) Int. Cl.
*G06F 15/16* (2006.01)
(52) U.S. Cl. .......................... 709/206; 709/204; 709/201
(58) Field of Classification Search .................. 709/204, 709/205, 206, 207, 213, 217, 226; 707/1, 707/9, 10
See application file for complete search history.

(56) References Cited

U.S. PATENT DOCUMENTS

| | | | |
|---|---|---|---|
| 7,058,014 B2 * | 6/2006 | Sim | 370/230 |
| 7,277,950 B1 * | 10/2007 | Chapweske | 709/227 |
| 7,627,644 B2 * | 12/2009 | Slack-Smith | 709/213 |
| 7,631,098 B2 * | 12/2009 | Boutboul et al. | 709/238 |
| 7,653,689 B1 * | 1/2010 | Champagne et al. | 709/206 |
| 2002/0049760 A1 * | 4/2002 | Scott et al. | 707/10 |
| 2002/0198930 A1 * | 12/2002 | Jones et al. | 709/201 |
| 2003/0061287 A1 * | 3/2003 | Yu et al. | 709/205 |
| 2003/0204602 A1 * | 10/2003 | Hudson et al. | 709/228 |
| 2003/0233455 A1 * | 12/2003 | Leber et al. | 709/226 |
| 2004/0136244 A1 * | 7/2004 | Nakamura et al. | 365/200 |
| 2004/0205199 A1 * | 10/2004 | Gormish | 709/229 |
| 2004/0216164 A1 * | 10/2004 | Hayhurst | 725/86 |
| 2005/0203851 A1 * | 9/2005 | King et al. | 705/51 |
| 2005/0216559 A1 * | 9/2005 | Manion et al. | 709/205 |
| 2006/0069800 A1 * | 3/2006 | Li | 709/232 |
| 2006/0089997 A1 * | 4/2006 | Inokuchi | 709/228 |
| 2006/0095582 A1 * | 5/2006 | Nitya et al. | 709/236 |
| 2006/0149753 A1 * | 7/2006 | Medard et al. | 707/100 |
| 2006/0218222 A1 * | 9/2006 | Brahmbhatt et al. | 709/201 |
| 2006/0242155 A1 * | 10/2006 | Moore et al. | 707/10 |

OTHER PUBLICATIONS

Hefeeda et al.; A hybrid architecture for cost-effective on-demand media streaming; Nov. 2002; Department of Computer Sciences, Purdue University; Section 4.2.*
Eaton et al.; Improving Bandwidth Efficiency of Peer-to-Peer Storage; 2004; Computer Science Division, University of California, Berkeley; Proceedings of the Fourth International Conference on Peer-to-Peer Computing; Section 4.3.*

(Continued)

*Primary Examiner* — John Follansbee
*Assistant Examiner* — Madhu Woolcock
(74) *Attorney, Agent, or Firm* — Carter, DeLuca, Farrell & Schmidt, LLP

(57) ABSTRACT

A peer-to-peer filing sharing system and method are provided which allow peers in a P2P network system to download segments of a large file in indeterminate order, storing them in a database and making those segments available to other peers in the P2P network system. Given the possibility that only a few peers in the P2P network system may have a complete copy of the file at any given time, the potentially many peers each having a different subset of segments from the total file, can immediately make the segments available to other peers. Given a sufficient number of peers, and a reasonable amount of time, it is highly likely that a complete copy of the file will exist and be distributed throughout the P2P network system, even if the original provider disconnects from the P2P network system or by some other reason becomes unavailable.

14 Claims, 3 Drawing Sheets

OTHER PUBLICATIONS

European Search Report dated May 29, 2007, EP 07 10 5638, Xerox Corporation.
Hafeeda et al., "A hybrid architecture for cost-effective on-demand media streaming", Computer Networks, vol. 44, pp. 353-382 (2004).
Eaton et al., "Improving Bandwidth Efficiency of Peer-to-Peer Storage", The Computer Society, University of CA, Proceedings of 4th Intnl. Conf. (2004).
Tolia et al., "Opportunistic Use of Content Addressable Storage for Distributed Flle Systems", USENIX Assoc., Proceedings of the General Track (2003).
BitTorrentSpecification, TheoryOrg, Bittorrent Protocol Specification v1.0, http://wiki.theory.org/BitTorrentSpecification, pp. 1-26, printed on Nov. 13, 2009.

* cited by examiner

PEER-TO-PEER FILE SHARING SYSTEM AND METHOD USING DOWNLOADABLE DATA SEGMENTS

BACKGROUND

The present disclosure relates to peer-to-peer network systems, more specifically, the present disclosure relates to a peer-to-peer file sharing system and method using downloadable data segments.

In a peer-to-peer (P2P) network system, there exists a method of sharing a file among the one or more peers (providers) who have a complete copy of the file, and other peers (consumers) who desire to obtain the file by downloading. Once a consumer has downloaded all or part of the file, it may begin providing the file to other consumers. In this manner, the peers distribute the "work" of downloading and uploading the file across the P2P network system. Files are downloaded beginning with the first byte, and proceeding sequentially to the last byte until the entire file has been downloaded.

A main problem of the above-described peer-to-peer file sharing method is that none of the consumers have a complete copy of the file and, if the providers become unavailable, the consumers must wait indefinitely for the complete file to become available in order for downloading to continue. When the file becomes available again, downloading begins from the offset of the last successfully retrieved byte.

The problem particularly arises when very few peers of the peer-to-peer file sharing system have a complete copy of the entire file; the problem is exacerbated when the file is a large file. The problem is illustrated by the following example.

1. Peer A connects to the peer-to-peer (P2P) network system and makes File1.txt (1024 bytes) available to the network.
2. Peer B begins downloading the file from Peer A beginning at the first byte and successfully downloads 512 bytes of data, and begins providing the data (at this point the peer is both a provider and a consumer).
3. Peer C begins downloading the file from Peer A beginning at the first byte and successfully downloads 256 bytes of data.
4. Peer A disconnects from the network (or otherwise ceases to provide File1.txt).
5. Peer C continues to download data from Peer B and successfully downloads another 256 bytes of data (for a total of 512 bytes).

At this point there are no providers on the P2P network system that have a copy of the last 512 bytes of File1.txt as Peer B only managed to download the first 512 bytes before Peer A disconnected from the network. Both Peer B and Peer C must wait indefinitely for the complete file to become available. If other consumers connect to the P2P network and request the file, Peer B and Peer C may provide the partial copy of the file downloaded to the other peers, but until a provider with a complete copy of the file connects to the P2P network none of the consumers will be able to download the file, effectively halting the progress of the data transfer.

Peers are often expected to continue providing a file for some time after downloading it as "a courtesy" in order to make sure that a complete copy of the file remains on the P2P network system as long as possible. In many cases very few complete copies of the file may be available on the P2P network system, meaning that if any provider disconnects it harms the availability of the file for the entire P2P network system.

Based on the above, a need exists for a peer-to-peer file sharing system and method which overcomes the problem associated with prior art P2P network systems.

SUMMARY

According to the present disclosure, a peer-to-peer filing sharing system and method are provided which allow peers in a P2P network system to download segments of a large file in indeterminate order, storing them in a database and making those segments available to other peers in the P2P network system. Given the possibility that only a few peers in the P2P network system may have a complete copy of the file at any given time, the potentially many peers each having a different subset of segments from the total file, can immediately make the segments available to other peers.

Given a sufficient number of peers, and a reasonable amount of time, it is highly likely that a complete copy of the file will exist and be distributed throughout the P2P network system, even if the original provider disconnects from the P2P network system or by some other reason becomes unavailable. This allows the remaining peers, each with incomplete copies of the file, to continue trading segments of the file in order to make a more complete copy of the file. Even if the superset of available segments is not a complete file, the various peers will be able to continue trading data after the original source of the file becomes unavailable, and be able to create a more complete copy of the file on each peer (until, finally all of the peers have an identical set of segments).

According to the present disclosure, a peer-to-peer file sharing system is provided for a P2P network system. The file sharing system includes a network having a plurality of peers and a processor for executing a set of programmable instructions for performing a peer-to-peer filing sharing method. The method includes requesting at least one segment of a file from at least one peer of a plurality of peers of a network; and providing at least a portion of the at least one requested segment to at least one peer. The system further includes a database storing at least one segment of the file.

The present disclosure further provides a peer-to-peer filing sharing method. The method includes requesting a segment of a file by a peer from at least one peer of a plurality of peers on a network; and providing at least a portion of the requested segment to the peer by the at least one peer of the plurality of peers on the network. The method further includes downloading at least a portion of the requested segment by the peer; and storing at least a portion of the downloaded segment to a database. The requested segment is identified by a notation specifying the length of the requested segment. The notation is (x, y), where x specifies the offset at which the requested segment begins and y specifies the length of the requested segment.

The method further includes selecting the requested segment by the peer by scanning a database to determine a segment that has not yet been retrieved from an originating source; and choosing a random offset from within the determined segment and a random length between the random offset and the end of the determined segment.

The present disclosure also provides a computer-readable storage medium storing a set of programmable instructions capable of being executed by at least one processor for performing the P2P file sharing method in accordance with the present disclosure.

BRIEF DESCRIPTION OF THE DRAWINGS

Various embodiments of the present disclosure will be described herein below with reference to the figures wherein.

DETAILED DESCRIPTION

Embodiments of the present disclosure will be described herein below with reference to the accompanying drawings. In the following description, well-known functions or constructions are not described in detail to avoid obscuring the present disclosure in unnecessary detail.

According to the present disclosure, a peer-to-peer file sharing system and method using downloadable data segments are provided which allow the data segments to be shared or traded among two or more peers of a P2P network system for making more complete copies of a file, especially a large file.

Figure 1:
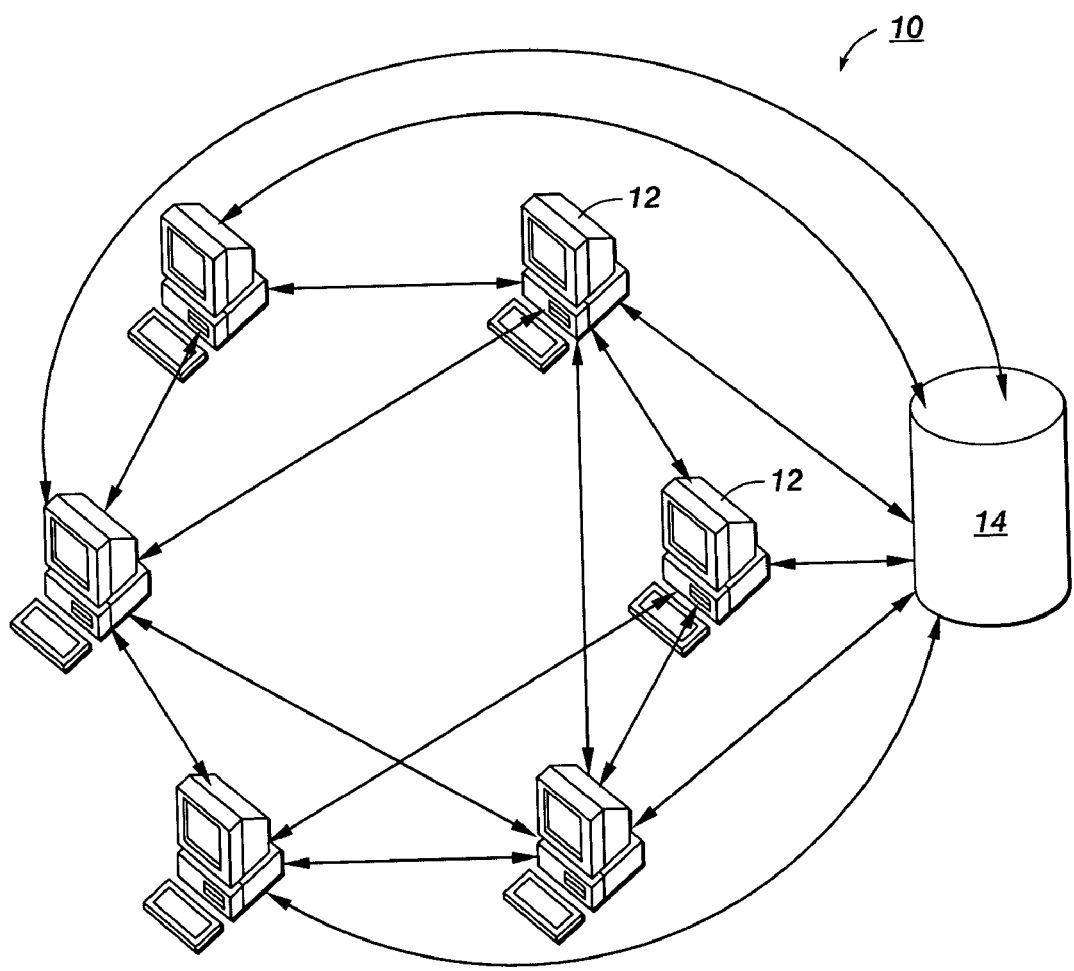
FIG. 1 is a block diagram of a P2P network system in accordance with the present disclosure.
Figure 3:
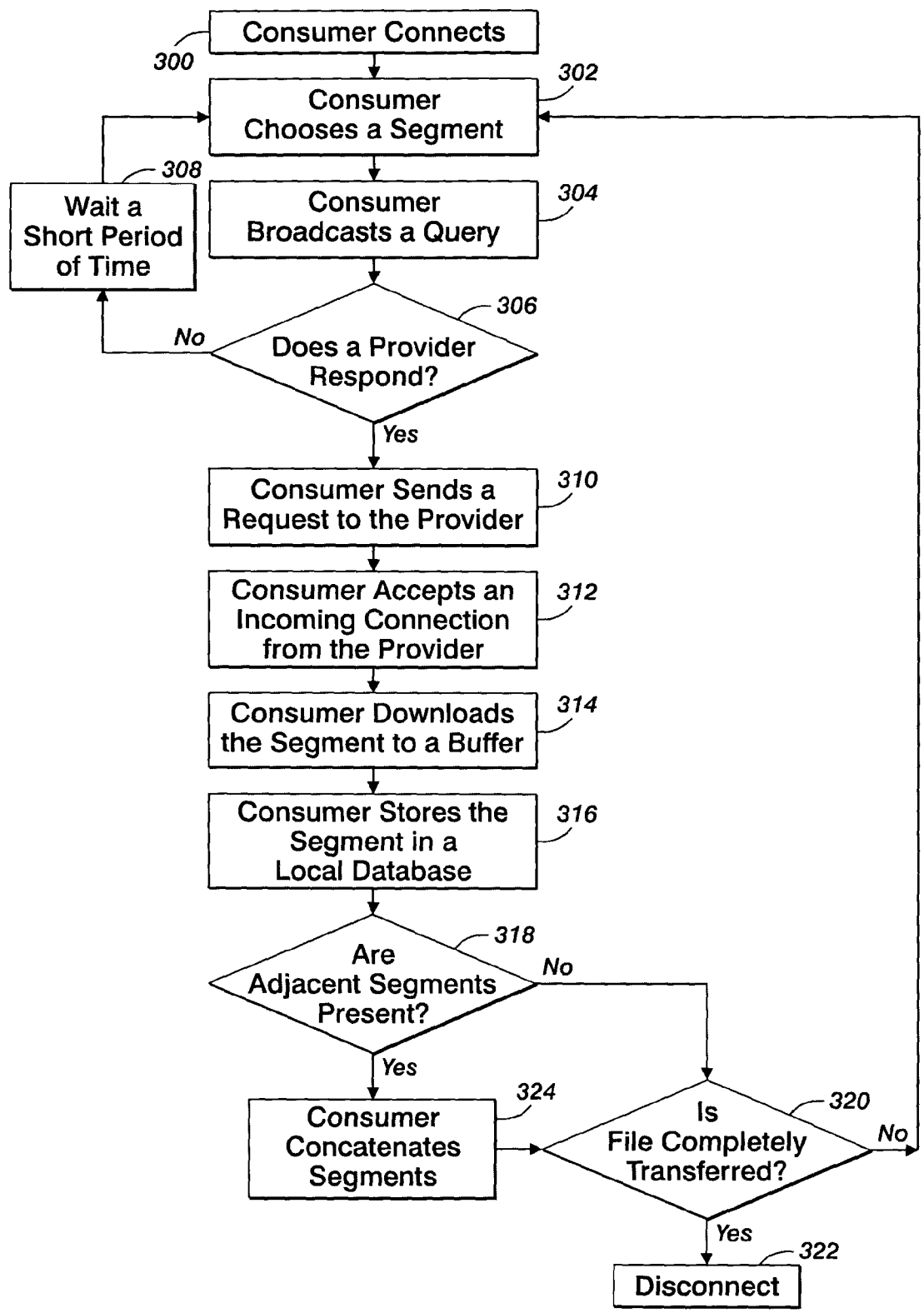
FIG. 3 is a flow chart illustrating a file sharing method for a P2P network system in accordance with the present disclosure.

Referring now to FIGS. 1 and 3, there are shown respectively a block diagram of an exemplary P2P network system and a method in accordance with the present disclosure. The exemplary system and method of the present disclosure will now be described in detail with reference to these figures. The P2P network system of the present disclosure designated generally by reference numeral 10 includes six peers 12 and a database 14 in communication with each of the six peers 12. Each peer 12 includes at least one processor for performing the method according to the present disclosure.

The at least one processor performs the functions and steps described herein below for performing the method according to the present disclosure. In particular, the at least one processor executes application software having a series of programmable instructions for performing the functions of the system and method according to the present disclosure. The application software can be stored on a computer-readable medium, such as a CD-ROM, DVD, hard drive, and diskette.

The peer-to-peer file sharing system and method according to the present disclosure solve the problem, or at least dramatically reduce the problem, of peers 12 having to wait indefinitely for another peer(s) 12 in an attempt to download a file when the latter peer(s) having a complete copy of the file become or is unavailable. The system and method according to the present disclosure change the manner that files are shared or transferred between peers 12 of the P2P network system 10.

According to the present disclosure, peers 12 (consumers) request segments chosen from different offsets within the desired file (the mechanism for choosing segments (e.g. offsets within the file, as well as the length of each segment) is discussed in more detail herein below). The segments are saved in the database 14 local to each peer 12, and the peer 12 (provider) immediately begins providing those segments to interested consumers. Because segments are chosen from offsets throughout the file, even if the original providers disconnect from the P2P network system 10, there is a much greater chance that a complete (or near complete) copy of the file will exist among the remaining consumers. The consumers can continue to trade segments of the file until each consumer has a copy of the superset of the available segments; even if each consumer does not have a complete copy of the file, they are likely to have much more of the file than conventional P2P network systems would allow given the sequential nature of the downloads.

Segments are represented in examples using the notation (offset, length). For example, (256,512) indicates a segment that begins at offset 256 and is 512 units long; not a segment that begins at offset 256 and ends at offset 512. The most commonly used unit of measurement for data transfer is bytes, but the mechanisms described herein can be applied to any unit of measurement (e.g., bits, bytes, words, etc.).

The following example illustrates the operation of the system and method according to the present disclosure.

1. Peer A connects to the P2P network system 10 and makes File2.txt (1024 bytes) available to the P2P network system 10.
2. Peer B begins downloading the file from Peer A, successfully obtaining the segment of (512, 512).
3. Peer C begins downloading the file from Peer A, successfully obtaining the segment (0, 256).
4. Peer A disconnects from the P2P network system 10 (or otherwise ceases to provide File2.txt).
5. Peer B begins downloading the file from Peer C, successfully obtaining the segment (0, 256) (Peer B now has two segments of the file; (0, 256), and (512, 512)).
6. Peer C begins downloading the file from Peer B, successfully obtaining the segment (512, 512) (Peer C now has two segments of the file; (0, 256), and (512, 512)).

This example does not provide the ideal scenario because at this point there are no providers on the P2P network system 10 that have a complete copy of the file (the segment (256, 256) is missing), however peers B and C have a larger portion of the file than they otherwise would have, giving each peer 75% of the available file even though each transferred exactly the same number of bytes from Peer A as the equivalent peers in the example provided in the Background section.

With the system and method according to the present disclosure, as can be seen by the above example, the overall distribution of File1.txt has improved because the peers 12 continued to exchange segments of the file after the original provider disconnected from the P2P network system 10, and the peers 12 each had different segments of data. More importantly, if any provider connects to the P2P network system 10 with the missing segment (not necessarily the complete file) all of the peers 12 will be able to exchange missing segments and create a complete copy of the file at each peer 12. As long as the superset of all available segments on the P2P network system 10 contains a complete copy of the file, no one peer 12 needs to have the whole file in order for all of the peers 12 to continue working. This differs from conventional P2P network systems in that a complete copy of the file must be present somewhere on the P2P network system in order for all of the peers to access the file.

It is possible, if the segments of the file that each peer downloads are chosen intelligently, to make the complete file available for only a (relatively) very short period of time (until each segment has been downloaded by at least one peer), allowing the original provider to disconnect, or stop providing the file without adversely affecting the P2P network system 10. As the number of peers 12 increase, the number of providers required to contain a complete copy of the file decreases.

Data Segment

A data segment is a sequential subset of the contents of a file or document defined using an offset and a length. The offset indicates the position within the file at which the segment begins (e.g. an offset of "0" would refer to the first byte in a file, while an offset of "99" would refer to the $100^{th}$ byte in a file). The length indicates the amount of data in the segment, beginning at the offset (e.g. an offset of "0" and a length of "5" would refer to bytes 0, 1, 2, 3, and 4 in a file). As mentioned previously, segments are represented herein using the notation (offset, length).

Finding a Resource

In a "pure" P2P network system, as shown by FIG. 1, there are no central data repositories or servers that collect information about the system and the available resources. In such systems, peers must communicate by broadcasting requests to the network and waiting for responses. A consumer uses such broadcast messages to issue requests to the P2P network system for a desired resource, and a provider responds if and only if it can provide at least some of the data in the requested resource. A provider may advertise available resources using a similar mechanism, and a consumer will respond if and only if it requires at least some of the data in the resource.

Other P2P network systems use servers (centrally located "trackers" or distributed servers that track local resources and forward requests for other resources up a hierarchy similar to the way that the Domain Name System works). In such systems, the peers may issue broadcast requests upon connecting to the P2P network system 10 to discover the trackers; only trackers respond to such requests (other peers ignore the requests entirely). Once a provider has discovered a tracker it advertises available resources to the tracker. Consumers issue requests for resources directly to the tracker, and the tracker responds with one or more providers capable of transferring the requested resource.

It is possible that any peer on the P2P network system 10 may choose to take on the role of a tracker, but the roles of tracker, provider, and consumer are considered logically separate.

Choosing a Segment

The consumer may choose a segment in a number of ways, a few of which are described herein. In any case, it is recommended that the maximum length of the segments be limited to a relatively small number in order to prevent the consumers from attempting to download too much data at once. The smaller the segment, the higher the likelihood that a consumer will be able to retrieve the entire segment before the provider becomes unavailable (though consumers can easily handle partial segments as described in the next sub-section below).

The consumer may choose a completely random segment. The consumer does this by randomly selecting any segment that has not yet been retrieved (this can by done by scanning the local database); a missing segment is considered to be the entire range of bytes between segments that have already been retrieved, and may include the entire file if the consumer has yet to retrieve any segments. Once a missing segment has been located the consumer chooses a random offset from within the segment, and a random length between the offset and the end of the segment.

The consumer may choose a random segment of a fixed length. The consumer does this by choosing a fixed length (this may be determined randomly before the transfer begins, or through a configurable property). The consumer then calculates the following:

number of segments=total length/segment length offset=random(number of segments)*segment length Of course the consumer must repeat the random offset selection until an offset is found for a segment that has not already been retrieved. It is important to note that providers are free to transfer only a portion of a segment, and consumers are free to choose providers that do not provide an entire segment. In this case, the consumer that chooses a random segment of a fixed length must buffer the partial segment temporarily and issue subsequent requests for the remainder of the segment until the entire segment has been transferred before storing the segment in the local database.

Finally, the consumer may request a segment using a filter that indicates which segments are acceptable. The filter should specify a subset of the byte ranges that represent segments that have not yet been transferred to the consumer, and is most commonly represented by a list of segments: {(offset, length), (offset, length), . . . }. Providers are free to choose any offset and length that describes a sub-segment of any segment in the list and offer to provide that to the consumer. This is discussed in more detail below.

Consuming a Segment

Once a segment has been chosen for transfer by the consumer a query must be issued to the P2P network system 10 in the form of a broadcast (in a "pure" P2P network system), or a request to the tracker. The broadcast should contain the parameters of the segment (offset and length, or a filter describing the acceptable data segments). A peer 12 on the P2P network system 10 responds if and only if it can provide at least some of the data in the segment; the response includes the segment offset, and the available length (less than or equal to the length requested by the consumer).

The consumer may choose the first provider to respond, or may choose to wait for a short interval and choose the best provider. Logically the best provider is the first provider to respond that can provide the entire requested segment; the first provider to respond likely has the most resources to handle the request, and/or the least amount of network latency. If none of the providers can provide the entire segment, the consumer logically chooses the first provider that can provide most of the segment. If no provider responds the consumer may choose to wait for a period of time before submitting a new request for the same segment, or a newly chosen segment.

Once the consumer has chosen a provider, the consumer sends a request directly to the provider for the desired segment including offset and length. Once a connection between the peers has been established, the consumer downloads the segment and streams it into a temporary buffer. Once the transfer has completed the consumer writes the segment to a local database.

In the event that the transfer fails, the consumer may reissue the request. Providers with a high failure rate may be blacklisted (temporarily or permanently) by the consumer, allowing the consumer to choose to ignore responses from the provider entirely for a period of time, or to simply use other providers whenever possible. The consumer may treat partially successful transfers as successful transfers of a smaller data segment, storing the partial segment in the local database and issuing a new request for the remainder of the segment (or an entirely new segment).

Storing Segments

Once a consumer has successfully transferred a segment (whole or in part), and optionally validated the integrity of the segment (via a checksum or some other mechanism of validation) the segment is stored in the database 14. The implementation of the database 14 is open, but may simply be a directory containing a set of flat files and a manifest used to identify the segments stored in each file. It may also be more robust (such as an Oracle® database containing a table with rows representing each segment, and the binary segment itself stored as a BLOB within each row). The consumer should concatenate sequential segments as they are stored in order to make providing segments easier. The consumer may choose to perform concatenation synchronously (as segments are retrieved) or asynchronously; in the event that concatenation is performed asynchronously, the segments should be marked within the database (to indicate that concatenation is being performed) and any requests for data within marked segments should be delayed until the concatenation has been completed. Such delayed requests may cause consumers to select another provider, which is appropriate in the event that the consumer is spending resources on concatenation.

Providing a Segment

A provider that receives a query about a specific segment for which at least some of the data is available locally should respond with a message containing the offset and the length up to, but not exceeding, the length of the requested segment. If the consumer responds with a request for the data segment, the provider should establish a connection with the consumer and begin uploading the data in the segment. The provider may choose to maintain a separate database regarding which segments have been transferred to which consumers. If several transfers to a specific consumer fail, the provider may blacklist the consumer temporarily to avoid wasting resources trying to transfer data to an unreliable peer when other, more reliable peers may be better served.

A provider may also receive a query including a filter that describes the data segments that the consumer requires. The provider is free to respond to the query with any segment of any length that is currently available from the requested resource that is accepted by the filter. The provider may wish to use statistics about segments that have been transmitted to this or other consumers in order to choose segments that have not been uploaded as frequently in order to increase the chance that the superset of segments available in the P2P network system 10 includes a copy of the entire file, but this is not required; the provider may also randomly choose a segment, or simply upload segments sequentially; the provider is completely free to choose any segment that is accepted by the filter.

In a typical P2P file transfer system, it is considered common courtesy for a consumer to begin providing a resource as soon as the first data from the resource is successfully downloaded to the client; this expectation extends to the P2P network system 10 according to the present disclosure. In many such P2P network systems it is also considered common courtesy to continue providing a resource for some amount of time after the entire resource has been transferred to the consumer. This is less important in the P2P network system 10 according to the present disclosure as it is much more likely that one or more complete copies of the resource exist in the superset of segments available in the P2P network system 10 at any given time.

Example Flow

This sub-section includes an example flow involving a small number of peers 12 exchanging data using randomly chosen segments of a fixed length. For the purpose of this example all data is transferred in units of whole bytes. Segments are defined using the notation (offset, length) (e.g. (0,256) is the segment beginning at offset 0, containing 256 bytes of data). Filters are specified as a list of segments (e.g. {(0,256), (512,256)}; any segment containing a subset of the data in the segments specified by the filter is accepted by the filter).

1. Peer A connects to the P2P network system 10 and begins providing File1.txt, a file containing 1024 bytes of data. Peer A is the originating source of File1.txt.
2. Peer B connects to the P2P network system 10 and issues a broadcast query for the segment (0, 256) for File1.txt.
3. Peer A responds to the query indicating that it can provide the full segment.
4. Peer B issues a request for segment (0, 256) directly to Peer A. Peer A transfers segment to Peer B. Peer B stores the segment in the database 14.
5. Peer C connects to the P2P network system 10 and issues a broadcast query for segment (512, 256) for File1.txt.
6. Peer B ignores the query; segment (512, 256) is not available. Peer A responds to the query indicating that it can provide the full segment.
7. Peer C issues a request for segment (512,256) directly to Peer A. Peer A transfers the segment to Peer C. Peer C stores the segment in the database 14.
8. Peer B broadcasts a query for any segment matching the filter {(256,768)}.
9. Peer A responds to the query indicating that it can provide segment (256,256). Peer C responds to the request indicating that it can provide segment (512,256).
10. Peer B issues a request for segment (512,256) directly to Peer C. Peer C transfers the segment to Peer B. Peer B stores the segment in the database 14.
11. Peer C broadcasts a query for any segment matching the filter {(0,512), (768, 256)}.
12. Peer A responds to the query indicating that it can provide segment (768,256). Peer B responds to the query indicating that it can provide segment (0,256).
13. Peer C issues a request for segment (768,256) directly to Peer A. Peer A transfers the segment to Peer C. Peer C stores the segment in the database 14. Peer C begins concatenating segments (512,256) and (768,256) into a single segment: (512, 512).
14. Peer B broadcasts a query for any segment matching the filter {(256,256), (768,256)}.
15. Peer A responds to the query indicating that it can provide segment (256,256). Peer C responds indicating that it can provide segment (768, 256).
16. Peer B issues a request for segment (256, 256) directly to Peer A. Peer A transfers the segment to Peer B. Peer B stores the segment in the database 14. Peer B begins concatenating segments (0,256), (256, 256), and (512, 256) into a single segment (0,768).
17. Peer A disconnects from the P2P network system 10. There are now no peers 12 offering a complete copy of File1.txt.
18. Peer C broadcasts a query for any segment matching the filter {(0, 512)}.
19. Peer B responds to the query indicating that it can provide segment (256,256).
20. Peer C issues a request for segment (256, 256) directly to Peer B. Peer B transfers the segment to Peer C. Peer C stores the segment in the database 14. Peer C begins concatenating segments (256, 256) and (512, 512) into a single segment: (256, 768).
21. Peer B broadcasts a query for segment (768, 256).
22. Peer C responds to the query indicating that it can provide segment (768, 256).
23. Peer B issues a request for segment (768,256) directly to Peer C. Peer C transfers the segment to Peer B. Peer B stores the segment in the database 14. Peer B begins concatenating the segments (0,768) and (768,256) into the complete File1.txt, a file containing 1024 bytes of data.
24. Peer C broadcasts a query for segment (0,256).
25. Peer B responds to the query indicating that it can provide segment (0,256).
26. Peer C issues a request for segment (0, 256) directly to Peer B. Peer B transfers the segment to Peer C. Peer C stores the segment in the database 14. Peer C begins concatenating the segments (0,256) and (256, 768) into the complete File1.txt, a file containing 1024 bytes of data.

Figure 2:
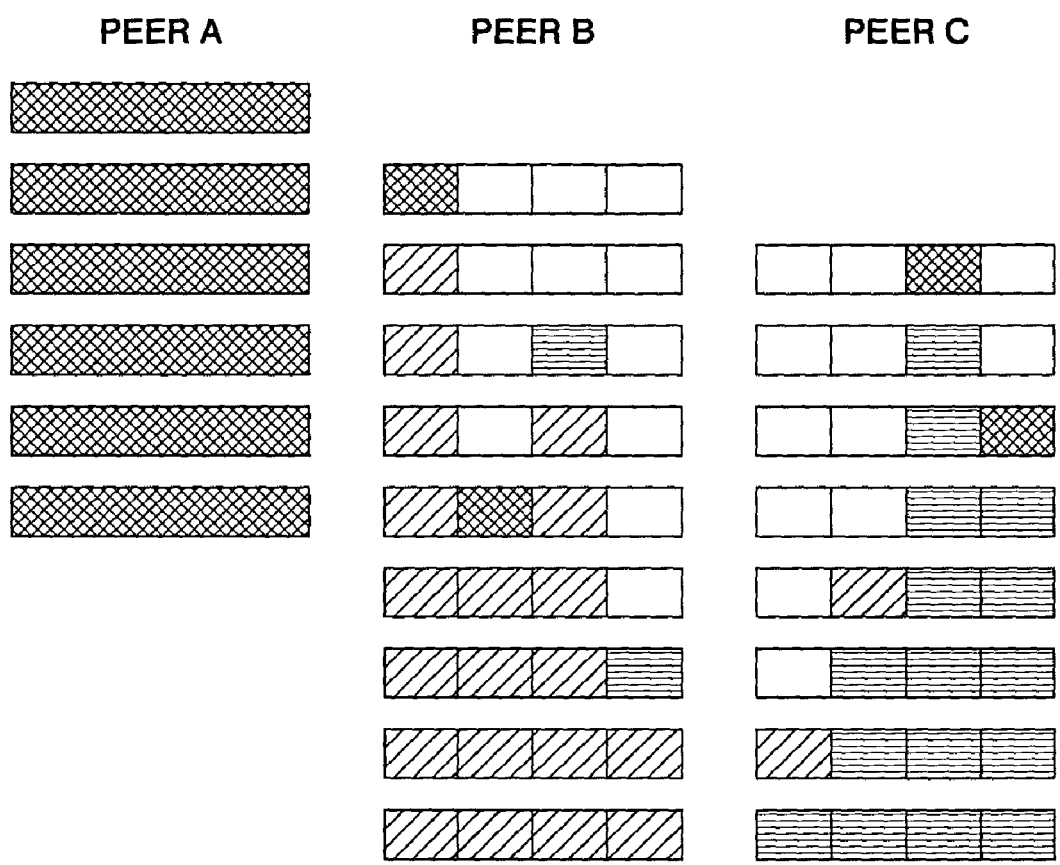
FIG. 2 is a diagram illustrating an exemplary flow of peers exchanging data in accordance with the present disclosure.

At this point Peers B and C both have a complete copy of the File1.txt despite the fact that Peer A disconnected from the P2P network system 10 in step 18, before either peer had downloaded a complete copy of the file. This example illustrates an ideal case in which the file transfers continue after the complete copy of the resource is removed from the P2P network system 10, and all peers 12 are able to obtain a complete copy. FIG. 2 illustrates the data transfer. Segments are initially shaded to represent the peer 12 from which they were transferred.

This example illustrates the advantages of the P2P file transfer system and method using downloadable data segments according to the present disclosure; once Peer A disconnects from the network 10, Peers B and C continue trading information and are able to piece together complete copies of the file from the superset of segments available on the network 10.

In conventional P2P network systems, once Peer A removed File1.txt from the system, the remaining peers would be forced to wait (indefinitely) for Peer A or another provider to continue offering the resource. In some conventional P2P network systems, this wait could take days, weeks, or (in the worst case) the complete resource would never again become available.

There are other advantages to the presently described system and method as well. In the above example, Peer A is the first peer to obtain a vital resource that all of the other peers must obtain. Imagine a scenario where several peers in a P2P network system must obtain a large software patch. A single peer is allowed to connect through the firewall and download the patch from the internet. The patch must now be distributed to the remaining peers on the P2P network system; this download will occur only once for every peer in the network, meaning that future distribution among peers will be minimal, thus leveraging a traditional P2P system's ability to distribute the patch from consumer to consumer is minimized.

In such a conventional P2P network system, data transfers begin at the first byte of data and proceed sequentially to the end of the file. If a small minority of providers has access to the complete file, and a large majority of consumers are all downloading the file at about the same rate starting at about the same time, this results in a large amount of stress on the providers (a potentially disastrous scenario if the peer is expected to use resources to perform duties not strictly related to file serving, such as monitoring the state of a print device or running diagnostics); all of the consumers have downloaded approximately the same fraction of the file in the same amount of time, meaning that very little sharing can or will occur between the consumers.

In the system and method according to the present disclosure, however, the consumers each download different portions of the file and can immediately begin trading disparate segments with their peers, relieving the stress from the original content provider.

FIG. 3 outlines the flow of events for a single consumer similar to the example flow above. In the flow illustrated by FIG. 3, a consumer connects, downloads a single file (or the remainder of a previously started file) and then disconnects from the P2P network system 10. In Step 300 the consumer connects to the P2P network system 10 and chooses a segment to download at Step 302. At Step 304, the consumer broadcasts a query to the other peers in the P2P network system 10 requesting the chosen segment.

At Step 306, it is determined whether a provider responds to the query. If no, the consumer waits a short period of time at Step 308 before choosing the same segment or another segment to download at Step 302. If yes, at Step 310, the consumer sends a request to at least one provider who responded to the query. At Step 312, the consumer accepts an incoming connection from the provider and at Step 314 the consumer downloads the segment to a buffer. The downloaded segment is then saved by the consumer in the database 14 at Step 316.

At Step 318 it is determined whether segments adjacent to the downloaded segment are present in the database 14. If no, then it is determined at Step 320 whether the file has been completely transferred or downloaded to the consumer. If yes, then the consumer disconnects from the P2P network system at Step 322. If at Step 318 it is determined that there are segments adjacent to the downloaded segment, then at Step 324 the consumer concatenates the segments, before it is determined whether the file has been completely transferred to the consumer at Step 320. If it is determined at Step 320 that the file has not been completely transferred to the consumer, then the process returns to Step 302 where the consumer chooses another segment of the file to be transferred or downloaded.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A peer-to-peer filing sharing method comprising:
    sharing data by peers in a distributed peer-to-peer network that is without a centralized server, comprising:
    broadcasting a first request by a first peer of a plurality of peers on a network, wherein the first request is broadcast to the plurality of peers and includes a filter describing at least a first and second data segment of a file having a plurality of data segments that is requested by the first peer, wherein the at least first and second data segments are smaller than the file, wherein each peer of the plurality of peers includes a hardware processor, and wherein it is not required that any single peer of the plurality of peers include a complete copy of said file;
    wherein the requested first data segment is identified by a notation specifying a length of the requested first data segment, and wherein the notation is (x,y), where x specifies an offset at which the requested first data segment begins and y specifies the length of the requested first data segment;
    selecting by a second peer of at least two second peers a segment from the at least first and second data segments described in the filter based on a statistical analysis of segments that have already been provided from the second peer to the plurality of peers on the network to increase the chance of availability amongst the plurality of peers on the network of an entire set of segments making up the entire file;
    responding by the second peer to the request with notification of availability of the selected segment;
    receiving notification by the first peer that an incomplete portion of the first data segment of the at least first and second data segments is stored in the at least two second peers of the plurality of peers;

requesting by the first peer that the incomplete portion of the requested first data segment be provided to the first peer by a peer selected from the at least two second peers;

receiving by the first peer the incomplete portion of the requested first data segment from said selected peer;

buffering by the first peer the incomplete portion in a temporary buffer;

broadcasting by the first peer a second request including a single filter describing at least third and fourth non-contiguous data segments of the file requested by the first peer that do not include the received incomplete portion;

wherein the single filter is identified by a notation {(p,q), (r,s)}, wherein (p,q) identifies the third non-contiguous data segment of the file and (r,s) identifies the fourth non-contiguous segment of the file, where p and r specify non-contiguous offsets at which the requested third and fourth data segments being, respectively, and q and s specify the length of the requested third and fourth data segments, respectively; and acquiring by the first peer the remaining portions of the first data segment from the plurality of peers and storing the acquired portions of the first data segment in the temporary buffer until all of the remaining portions of the first data segment is are acquired, after which first data segment is completely stored in a database;

wherein said first peer continues to request and receive different segments of said file that it has not received yet, wherein the first peer receives a complete copy of the file by receiving portions of the file and not a complete copy of said file from at least two peers of the plurality of peers.

2. The method according to claim 1, further comprising the step of downloading at least a portion of the requested first data segment by the first peer; wherein if the downloading fails the peer providing the data that was attempted to be downloaded designates the first peer as blacklisted from receiving data from the providing peer in response to future requests from the first peer.

3. The method according to claim 2, further comprising the step of providing at least a portion of the requested first data segment by the first peer to another peer of the plurality of peers.

4. The method according to claim 3, further comprising concatenating sequential downloaded segments, and during the concatenation process marking the segments that are being concatenated as unavailable for provision to the another peer.

5. The method according to claim 2, further comprising the step of simultaneously downloading at least a portion of another segment by another peer of the plurality of peers.

6. The method according to claim 1, further comprising the step of an originating source of the file disconnecting from the network prior to the file being completely downloaded by at least one peer of the plurality of peers.

7. The method according to claim 1, further comprising the step of selecting the requested first data segment by the first peer by scanning a database to determine a segment that has not yet been retrieved from an originating source.

8. The method according to claim 7, further comprising the step of choosing a random offset from within the determined segment and a random length between the random offset and the end of the determined segment to describe and request by the first peer the remainder of the segment that has not yet been acquired.

9. The method according to claim 1, wherein the at least one response includes a message specifying an offset and a length not exceeding the length of the requested first data segment.

10. The method according to claim 1, wherein a second peer of the at least one second peer randomly chooses which segment of the at least first and second data segments to provide to the first peer.

11. A peer-to-peer filing sharing system comprising:
a network having a plurality of peers wherein the network is without a centralized server; and
at least one processor for executing a set of programmable instructions for performing a peer-to-peer filing sharing method comprising:
broadcasting a first request by a first peer of the plurality of peers, wherein the first request is broadcast to the plurality of peers and includes a filter describing at least a first and second data segment of a file having a plurality of data segments that is requested by the first peer, wherein the at least first and second data segments are smaller than the file, wherein each peer of the plurality of peers includes a hardware processor, and wherein it is not required that any single peer of the plurality of peers include a complete copy of said file;
wherein the requested first data segment is identified by a notation specifying a length of the requested first data segment, and wherein the notation is (x,y), where x specifies an offset at which the requested first data segment begins and y specifies the length of the requested first data segment;
selecting by a second peer of at least two second peers a segment from the at least first and second data segments described in the filter based on a statistical analysis of segments that have already been provided from the second peer to the plurality of peers on the network to increase the chance of availability amongst the plurality of peers on the network of an entire set of segments making up the entire file;
responding by the second peer to the request with notification of availability of the selected segment;
receiving notification the first peer that an incomplete portion of the first data segment of the at least first and second data segments is stored in the at least two second peers of the plurality of peers;
requesting by the first peer that the incomplete portion of the requested first data segment be provided to the first peer by a peer selected from the at least two second peers;
receiving by the first peer the incomplete portion of the requested first data segment from said selected peer;
buffering by the first peer the incomplete portion in a temporary buffer;
broadcasting by the first peer a second request including a single filter describing at least third and fourth non-contiguous data segments of the file requested by the first peer that do not include the received incomplete portion;
wherein the single filter is identified by a notation {(p,q), (r,s)}, wherein (p,q) identifies the third non-contiguous data segment of the file and (r,s) identifies the fourth non-contiguous segment of the file, where p and r specify non-contiguous offsets at which the requested third and fourth data segments being, respectively, and q and s specify the length of the requested third and fourth data segments, respectively; and acquiring by the first peer the remaining portions of the first data segment from the plurality of peers and storing the acquired portions of the first data segment in the temporary buffer until all of the remaining portions of the first data segment is are acquired, after which first data segment is completely stored in a database;

wherein said first peer continues to request and receive different segments of said file that it has not received yet, wherein the first peer receives a complete copy of the file by receiving portions of the file and not a complete copy of said file from at least two peers of the plurality of peers.

12. A non-transitory computer-readable storage medium storing a set of programmable instructions capable of being executed by at least one processor for performing a peer-to-peer file sharing method comprising:

broadcasting a first request by a first peer of a plurality of peers on a network, wherein the first request is broadcast to the plurality of peers and includes a filter describing at least a first and second data segment of a file haying a plurality of segments that is requested by the first peer, wherein the at least first and second data segments are smaller than the file, wherein each peer of the plurality of peers includes a hardware processor, and wherein it is not required that any single peer of the plurality of peers include a complete copy of said file;

wherein the requested first data segment is identified by a notation specifying a length of the requested first data segment, and wherein the notation is (x,y), where x specifies an offset at which the requested first data segment begins and y specifies the length of the requested first data segment;

selecting by a second peer of at least two second peers a segment from the at least first and second data segments described in the filter based on a statistical analysis of segments that have already been provided from the second peer to the plurality of peers on the network to increase the chance of availability amongst the plurality of peers on the network of an entire set of segments making up the entire file;

responding by the second peer to the request with notification of availability of the selected segment;

receiving notification by the first peer that an incomplete portion of the first data segment of the at least first and second data segments is stored in the at least two second peers of the plurality of peers;

requesting by the first peer that the incomplete portion of the requested first data segment be provided to the first peer by a peer selected from the at least two second peers;

receiving by the first peer the incomplete portion of the requested first data segment from said selected peer;

buffering by the first peer the incomplete portion in a temporary buffer;

broadcasting by the first peer a second request including a single filter describing at least third and fourth non-contiguous data segments of the file requested by the first peer that do not include the received incomplete portion;

wherein the single filter is identified by a notation {(p,q), (r,s)}, wherein (p,q) identifies the third non-contiguous data segment of the file and (r,s) identifies the fourth non-contiguous segment of the file, where p and r specify non-contiguous offsets at which the requested third and fourth data segments being, respectively, and q and s specify the length of the requested third and fourth data segments, respectively; and acquiring by the first peer the remaining portions of the first data segment from the plurality of peers and storing the acquired portions of the first data segment in the temporary buffer until all of the remaining portions of the first data segment are acquired, after which first data segment is completely stored in a database;

wherein said first peer continues to request and receive different segments of said file that it has not received yet, wherein the first peer receives a complete copy of the file by receiving portions of the file and not a complete copy of said file from at least two peers of the plurality of peers; and wherein the peer-to-peer file sharing method is implemented on a peer-to-peer network is without a centralized server.

13. The non-transitory storage medium according to claim 12, wherein the method further comprises:

downloading at least a portion of the requested first data segment by the first peer;

storing the at least a portion of the downloaded segment to a database; and providing by the first peer at least a portion of the requested first data segment to another peer of the plurality of peers, wherein the requested first data segment is identified by a notation specifying the length of the requested first data segment, and wherein the notation is (x, y), where x specifies the offset at which the requested first data segment begins and y specifies the length of the requested first data segment.

14. The non-transitory storage medium according to claim 12, wherein the method further comprises:

storing the received different segments in the database;

selecting the requested first data segment by scanning the database to determine a segment that has not yet been retrieved from an originating source;

choosing a random offset from within the determined segment and a random length between the random offset and the end of the determined segment; and describing the first data segment in terms of the chosen random offset and random length.

* * * * *